Dec. 7, 1943.  J. MIHALYI  2,336,277
FLASH LAMP SAFETY MECHANISM FOR PHOTOGRAPHIC CAMERAS
Filed June 8, 1940  2 Sheets-Sheet 1

JOSEPH MIHALYI
INVENTOR

BY
ATTORNEYS

Dec. 7, 1943.   J. MIHALYI   2,336,277
FLASH LAMP SAFETY MECHANISM FOR PHOTOGRAPHIC CAMERAS
Filed June 8, 1940   2 Sheets-Sheet 2
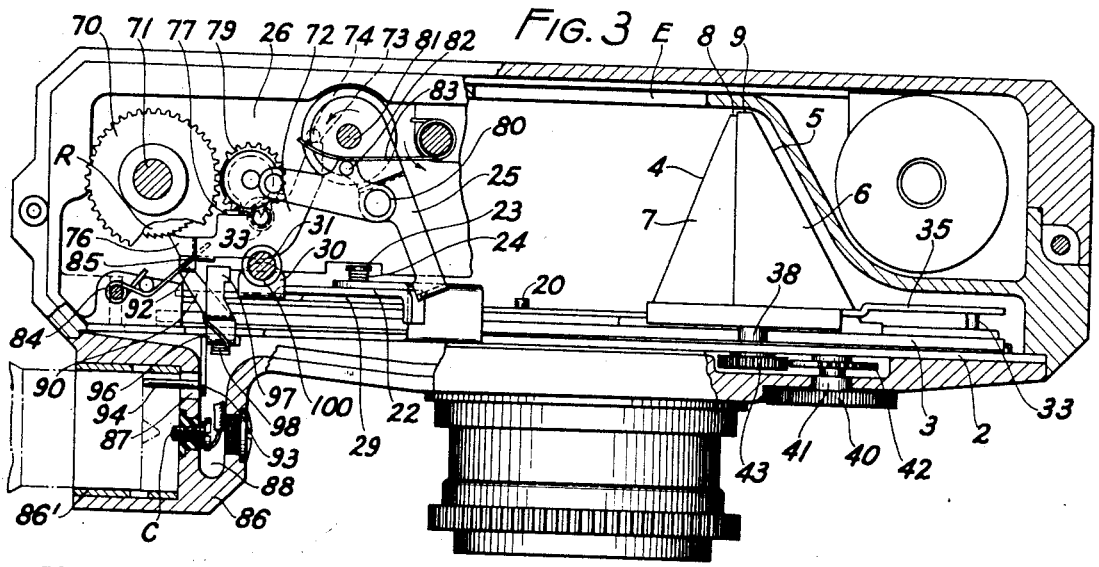
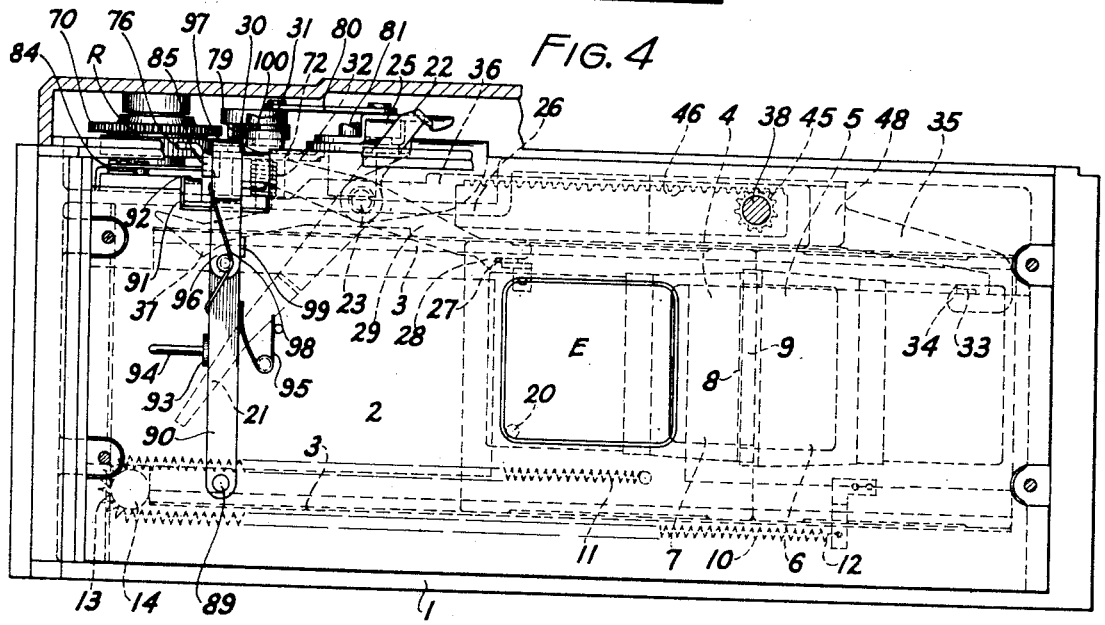
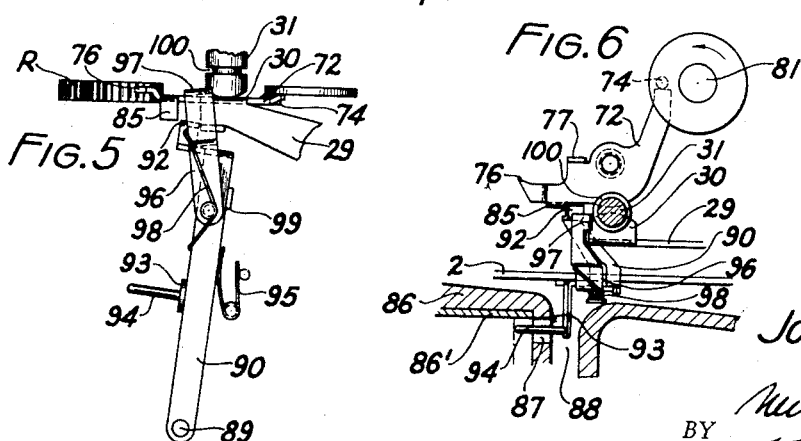
JOSEPH MIHALYI
INVENTOR
BY
ATTORNEYS Patented Dec. 7, 1943

2,336,277

UNITED STATES PATENT OFFICE 2,336,277

FLASH LAMP SAFETY MECHANISM FOR PHOTOGRAPHIC CAMERAS

Joseph Mihalyi, Rochester, N. Y., assignor to Eastman Kodak Company, Rochester, N. Y., a corporation of New Jersey Application June 8, 1940, Serial No. 339,523

23 Claims. (Cl. 95—31)

The present invention relates to photographic cameras adapted for taking flashlight pictures, and particularly to such cameras having means necessitating the removal of a burned flash lamp from its socket before a successive exposure can be made.

It is not an uncommon occurrence for a photographer taking flashlight pictures to make an exposure and find that he has forgotten to replace the flash lamp burned at the time of taking a previous exposure with a new lamp, with the result that his last picture is ruined because of the lack of sufficient light. Consequently, the need for means, in combination with cameras adapted for taking flashlight pictures, which will prevent a person from making an exposure until the lamp burned at the previous exposure is replaced by a new lamp is just as important as well-known double-exposure prevention means found on most of the better cameras today. It is to such a means that the present invention is directed.

One object of the present invention is to provide a photographic camera adapted for taking flashlight pictures in which the film wind and the shutter release member are both locked against a successive operation until the lamp burned at the time of making the previous exposure is removed from the lamp socket.

Another object is to provide a camera of the type described wherein either the film wind, or the shutter release, alone is locked against a successive operation until the previously burned lamp is removed from the lamp socket.

And a further object is to provide means of the type referred to for alternately locking and unlocking the film wind or shutter release which is entirely inoperative when no flash lamp is inserted in the socket, whereby the camera could be used in the regular way for daylight pictures without said means affecting the normal operation of the camera.

And yet another object is to provide a camera of the type described wherein the shutter setting means is locked against a second successive operation until the previously burned lamp is removed from the lamp socket.

Figure 1:
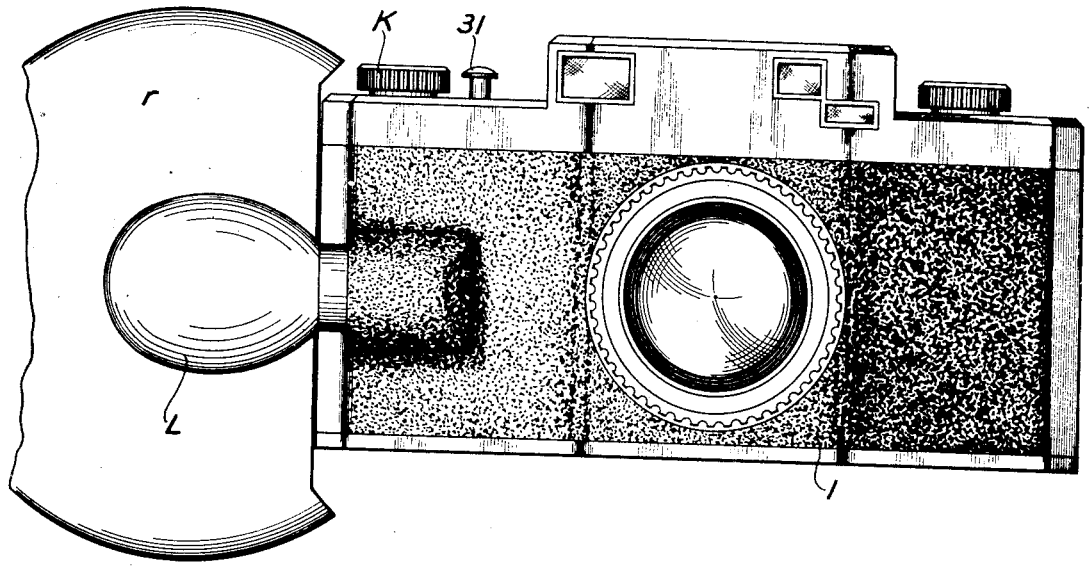
Figure 2:
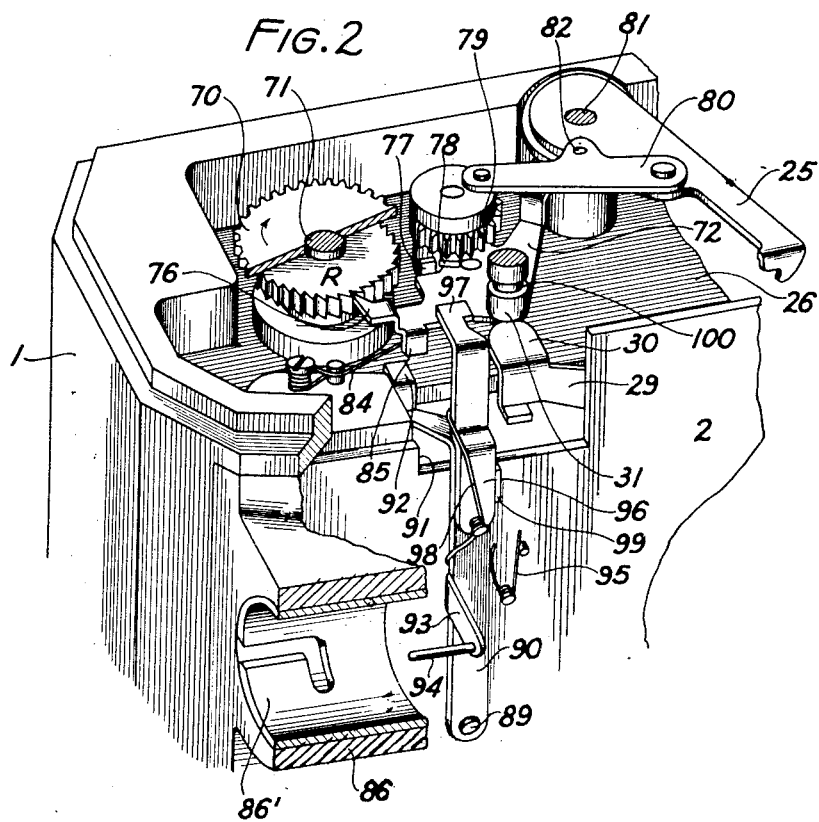

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings in which, Fig. 1 is a front elevation of a camera adapted for taking flashlight pictures, and equipped with a preferred embodiment of the present invention, Fig. 2 is an enlarged perspective of one end of the camera shown in Fig. 1, parts of the camera being removed, or broken away, to show a film wind and shutter release locking mechanism constructed in accordance with the preferred embodiment of the present invention, Fig. 3 is a plan view, partly in section, of the camera in Fig. 1 with the top removed, Fig. 4 is a longitudinal front view of the camera with the front plate carrying the objective, flash lamp socket, etc., removed, and the film wind and shutter release locking mechanism constituting the present invention being shown in its inoperative position, Fig. 5 is a fragmentary detail of the film wind and shutter release locking mechanism in an operative position to which it is moved by the insertion of a flash lamp into its socket, the film having been wound and the shutter having been set ready for an exposure, and Fig. 6 is a plan view of Fig. 5 with certain parts removed, and the relation of the locking mechanism to the lamp socket being clearly shown.

Like reference characters refer to corresponding parts throughout the drawings.

The film wind and shutter release locking mechanisms in accordance with the present invention can be readily adapted to any type of camera having any type of film wind or shutter, and may be such that both the film wind and the shutter release, or either one independent of the other, may be locked against a successive operation until the flash lamp previously burned is removed from the lamp socket. For the purpose of illustrating the preferred embodiment of the present invention I have shown the same combined with a camera having a shutter and film wind of the type fully set out in my copending application Serial No. 312,398, filed January 4, 1940, now Patent No. 2,238,500, dated April 15, 1941, and to which application reference can be had for a detailed explanation of the shutter and film wind mechanism which forms no part of the present invention except insofar as it acts in combination with my hereinafter described novel film wind and shutter release locking means.

As an embodiment of my invention, I have shown a camera having a body 1, in which there is mounted a mechanism plate 2, this plate supporting a pair of guide rails 3, on which the shutter plates 4 and 5 may slide. The shutter plate 4 has a rearward extension 7, so that the edges of these extensions 8 and 9 may closely approach the focal plane of the film. In order to move the shutter plates 4 and 5 there is provided a power spring 10, having one end 11 attached to the shutter plate 4, and the other end 12 attached to the shutter plate 5, the intermediate portion 13 of the spring being looped about an upstanding stud 14.

In this type of shutter, the exposure is made by releasing the shutter plate 4 in advance of the shutter plate 5. The difference in the time of the release of the two shutter plates provides an opening, or slot, between the extensions 8 and 9 of the shutter plates, and this slot in crossing an exposure aperture E, makes the exposure.

The shutter plates are set in the following manner: The shutter plate 4 carries a pin 20 which may be engaged by an arm 21 of a lever 22, pivoted on a stud 23 and normally held by a spring 24 in the position shown in Fig. 4. A second lever 25 may be mounted on the top wall 26 of the camera, and when this lever is swung to the left, with reference to Figs. 3 and 4, it rocks the lever 22 so that the arm 21, through its engagement with the stud 20, will cause the rearward extensions 8 and 9 of the shutter plates to first overlap and will then move the two shutter plates to the extreme end of the movement in which the plates will be latched and the spring 10 will be tensioned.

The plates 4 will be latched in an inoperative position by means of an upstanding lug 27 which will be engaged behind the latch member 28. This latch member consists of a lever 29, also pivoted upon stud 23 and having an end 30 lying beneath a shutter release trigger 31 normally held in an upraised position by the spring 32. When the trigger is depressed the latch 28 will be raised to release the shutter plate 4 whereupon the same will move under the action of the spring 10.

The shutter plate 5, when tensioned, is held by an upstanding lug 33 which is engaged by a lug 34, carried on the end of an arm 35. This arm consists of two members 35 and 36, which are mounted to be telescoped in such a manner that a downwardly projecting lug 37 on the end of arm 36 may be moved to and from the releasing latch 28 to vary the time of release of the second shutter plate 5 with respect to the release of the shutter plate 4. In Fig. 4, a relatively slow exposure is to be made so that the lug 37 lies at some distance from the latch 28. Consequently, when the shutter 4 has been released the lug 27 moves away from the latch 28, striking the downwardly extending lug 37 and rocking the two-part lever 35, 36 about the pivotal point 38 so that the latch member 34 will be lowered, releasing the latch 33. The spring ends 11 and 12 will each exert an equal force upon the two shutter plates 4 and 5, causing them to move across the exposure aperture E with a slot between them to make an exposure.

If it is desired to make a shorter exposure, the separations between the latch 28 and the downwardly extending projection 37 must be decreased. This may be done by turning the dial 40, mounted on the front wall of the camera and carried by a shaft 41 which, in turn, carries a mutilated gear 42. When the gear teeth 42 mesh with the pinion 43 mounted on a shaft 38, said shaft may be turned. The shaft 38 carries a second pinion 45 which meshes with a rack 46 to move the latter. This movement causes arm 36 to partially telescope arm 35, since the arm 36 fits within a box-like housing 48 carried by the arm 35. It will be obvious from Fig. 4 that if the pinion 45 is rotated in a clockwise direction, the rack will move the arm 36 and with it the downwardly extending lug to the right. The further this arm moves to the right, the shorter the duration of the exposure.

With this particular camera it is possible to simultaneously wind film and set the shutter, the following mechanism being provided for this purpose. Referring to Figs. 2 and 3, a gear wheel 70 may be mounted on a shaft 71 which may extend outside of the camera and terminate in a winding knob K. This gear wheel is shown in the position it assumes just after the film has been wound and the shutter has been set. Upon depressing the shutter release trigger 31, the lever 72 is bodily lowered, this action removing the flange 73 from the path of pin 74 rotatable with a film winding sprocket, not shown. At the same time, a pawl 76 is moved out of engagement with a ratchet R, fixed to the shaft 71 immediately below the gear, by the action of spring 84 acting on the downwardly turned lug 85 on the lever 72. This movement likewise causes a flange 77 to move out of the path of the downwardly extending flange 78 on the mutilated gear 79, so that this gear may mesh with the teeth of gear 70. By turning the shaft 71 the gear 70 is turned, rotating the gear 79 so that the crank arm 80 may move through one cycle, oscillating the lever 25 about its pivot 81, and thereby rocking the lever 22 to set the shutter as above described. The crank arm 80 includes a downwardly extending pin 82 which is normally acted on by the spring 83 fixed at one end to the camera body, whereby as soon as the flange 77 releases the gear 79 said gear is rotated until its teeth mesh with the teeth of gear 70.

As soon as the pin 74 has made one revolution in the direction shown by the arrow, the lever 72, which by this time has been released, by releasing the trigger 31, has moved upwardly into the path of pin 74. Consequently, when the pin 74 strikes the flange 73, the winding operation is stopped because the lever 72 is rocked about its pivot, bringing the pawl 76 into engagement with the ratchet R against the action of spring 84. The parts are then in position for a second operation.

Coming now to the present invention, it is the purpose of the same to provide a locking mechanism for the shutter trigger 31 and/or the film wind and shutter setting mechanisms, whereby the same cannot be operated twice in succession without first removing a previously burned flash lamp from the socket associated with the camera. To this end the following structure is provided.

While the socket for the flash lamp may be detachably connected to the camera, or associated therewith in any suitable manner, without going beyond the spirit of the invention, for the purpose of illustrating my invention I have chosen to show the front wall of the camera body built out to provide a lamp socket housing 86 integral therewith. This socket housing may have the conventional bayonet type socket 86' for receiving the new "peanut" bulb flash lamp L, or may have a conventional screw socket for receiving the ordinary flash lamp. The lower end of the socket 86' is provided with an opening 87 communicating with a recess 88 between the front wall and the mechanism plate 2 of the camera for the purpose hereinafter fully set forth; and a reflector r may be located in the camera behind the lamp in a suitable manner not shown.

Pivoted at 89 on the mechanism plate 2 is a lever 90 adapted to move in a plane parallel to the axis of the socket. The free end of the lever 90 extends through a cut-out 91 in the mechanism plate 2 and is provided with a projection 92 which is adapted to move to and from the path of arcuate movement of the downwardly turned lug 85 on the lever 72. The lever 90 possesses an arm 93 extending transversely of the socket and on which there is a pin 94 adapted to extend through the opening 87 in the bottom of the socket. The lever 90 is normally moved by a spring 95 to the inoperative position, shown in Figs. 2, 3, and 4, wherein the pin 94 extends into the socket beyond the plane normally assumed by the bottom of a lamp when seated therein, and in this position the projection 92 is out of the path of movement of the lug 85 on the lever 72.

Another lever 96 is pivoted at one end to the lever 90 to move therewith and relative thereto, and this lever includes an end 97 projecting through the cut-out 91 in the mechanism plate 2 and adjacent the shutter release trigger 31. This latter lever is normally moved to the right, looking at the drawings, by a spring 98 and into abutment with the lug 99 turned up at the edge of lever 90, and in which position it extends longitudinally of the lever 90. The described articulation of the levers 90 and 96 provides that the lever 96 moves to the right to an operative position, see Figs. 5 and 6, with a lever 90 when the latter is so moved by a lamp being inserted into the socket engaging the pin 94. The levers 90 and 96 are so arranged that before the projection 92 moves into the path of the lug 85, the end 97 on the lever 96 engages the shank of the shutter release trigger 31. Thus as the lever 90 continues to move to its operative position, the lever 96 is pivoted relative thereto and the spring 98 acts to normally force it against the shank of the trigger 31, see Figs. 5 and 6. Now when the shutter trigger is depressed to make an exposure the end 97 will snap into a circumferential groove 100 provided in the shank thereof, and will positively hold the trigger in a depressed position where it cannot be again operated. In order to release the shutter trigger so that it can return to its normal extended position, the end 97 must be removed from the groove 100 therein and this can be effected only by permitting a return of the articulated lever system 90 and 96 to its inoperative position, this being made possible by a removal of the lamp from the socket.

When the lever 90 is moved to its operative position by an insertion of a lamp into the socket the projection 92 is moved into the path of arcuate movement of the turned down lug 85 on the lever 72. This prevents the pawl 76 from being removed from engagement with the ratchet R so that the film cannot be wound until the lamp is removed from the socket.

It will be noticed that the ratchet R is of sufficient width that the pawl 76 when moved axially thereof by a downward movement of the lever 72, upon depression of the shutter release member 31, is not disengaged therefrom; but a pivotal movement of the lever 72 is required to move the pawl away from the ratchet. Such an arrangement is necessary to prevent the film wind from being unlocked by an actuation of the shutter release member 31.

The operation of the disclosed embodiment will now be described. Referring to the drawings, it will be noticed that the film has been wound and the winding mechanism is locked by the pawl 76 engaging the ratchet R, the shutter release trigger is in its extended position, or in other words, the camera is ready to make an exposure. In Figs. 2, 3, and 4, the articulated lever system is shown in the inoperative position it assumes when there is no lamp in the socket, the pin 94 extending through the base of the socket well beyond the plane assumed by the bottom of the lamp when inserted therein. Now when a lamp is inserted into the socket a sufficient distance for a contact on the bottom thereof to engage the contact C in the bottom of the socket, the pin 94 is pushed through the bottom of the socket and the articulated lever system, including levers 90 and 96, is moved to its operative position shown in Figs. 5 and 6. Now when the shutter release 31 is depressed to make an exposure, the end 97 of the lever 96 snaps into the circumferential groove 100 and locks the trigger in a retracted position until the lamp is removed from the socket to permit the lever 96 to return to its normal position with the lever 90 and thereby release the trigger. At the same time, the projection 92 on the lever 90 extends into the arcuate path of movement of the pawl 76 to prevent it from being moved to disengage the ratchet until the lamp is removed from the socket, whereby the film wind is locked until the lamp is changed. When the burned lamp is removed from the socket, the articulated lever system returns to its inoperative position after which the camera can be readied for a subsequent exposure before a new lamp is inserted into the socket.

It will be readily understood that the film wind and shutter release locking mechanism is such that when the same is in an inoperative position, or there is no lamp in the socket, it has no effect whatever upon the operation of the camera; and the camera could be used in the ordinary way for daylight photography regardless of its presence. While I have chosen to show by way of disclosing my invention, that the lamp socket is an integral part of the camera body, it is to be understood that the invention is not limited to such an arrangement. For instance, the camera could be provided with a capped opening adjacent which the end of the pin 94, or its equivalent, might extend, and into, or over, which an open ended socket might be detachably mounted onto the camera by jack plugs, or the like, in a well-known manner. While I have shown a mechanism for locking both the film wind and the shutter release against a successive operation until the previously burned lamp is removed from the lamp socket, such mechanism could be readily altered so that either the film wind, or the shutter release, alone could be locked against a successive operation until the burned lamp was removed from the socket. For example, if it were desired to lock only the shutter release against a successive operation, and not the film wind, then the turned-in portion of the lever 90 bearing the projection 92 could be removed to leave only that portion of the lever 90 on which the lever 96 is articulated. On the other hand, if it were desired to lock only the film wind against a successive operation, and not the shutter release, then the lever 96 and the spring 98 could be removed from the lever 90 to leave only lever 90 and its projection 92 cooperating with the lugs 85 on the pivoted lever 72.

Although I have shown and described certain specific embodiments of my invention, I am fully aware that many modifications thereof are possible. My invention, therefore, is not to be restricted except insofar as is necessitated by the scope of the appended claims.

Having thus described my invention, what I claim is new and desire to secure by Letters Patent of the United States is:

1. The combination with a photographic camera, including a film advancing means and a shutter operating means each capable of manual operation, of a socket associated with said camera and adapted to receive a flash lamp, means for releasably locking each of said film advancing means and said shutter operating means against two successive operations, and movable to and from an operative position, and means actuated by the insertion and removal of a lamp, into and from said socket for moving said locking means to and from said operative position, respectively, whereby a successive operation of said shutter operating means and said film advancing means cannot be made without first removing the burned lamp from the socket.

2. The combination with a photographic camera having a film advancing means, and a shutter operating means each capable of manual operation, including a shutter release member, of a socket associated with said camera and adapted to receive a flash lamp, means for releasably locking said film advancing means and said shutter release member against two successive operations, and movable to and from an operative position, and means actuated by the insertion and removal of a lamp into and from said socket for moving said locking means to and from said operative position, respectively, whereby a successive operation of said shutter release member and said film advancing means cannot be made until the burned lamp is removed from said socket.

3. The combination with a photographic camera including a manually operable film advancing means, of a socket associated with said camera and adapted to receive a flash lamp, means for releasably locking said film advancing means against two successive operations, and movable to and from an operative position, and means actuated by the insertion and removal of a lamp into and from said socket for moving said locking means to and from said operative position, respectively, whereby a second operation of said film advancing means cannot be made without first removing the burned lamp from the socket.

4. The combination with a photographic camera including a manually operable film advancing means for moving successive areas of film into position for exposure, of a socket associated with said camera and adapted to receive a flash lamp, means for releasably locking said film advancing means against two successive operations until the lamp has been removed from said socket, said means including a linkage movable to and from an operative position, and means actuated by the insertion and removal of a lamp into and from said socket for moving said linkage to and from said operative position, respectively.

5. The combination with a photographic camera including a manually operable film advancing means for moving successive areas of film into position for exposure, of a socket associated with said camera and adapted to receive a flash lamp, means for releasably locking said film advancing means against two successive operations until the lamp has been removed from said socket, said means including a member movable to and from locking engagement with said film advancing means and adapted to be automatically moved to an operative position upon the completion of a film advancing step, a linkage movable to and from an operative position wherein it is adapted to releasably lock said member in its operative position, and means actuated by the insertion and removal of a lamp into and from said socket for moving said linkage to and from said operative position, respectively.

6. The combination with a photographic camera including a manually operable film advancing means for moving successive areas of film into position for exposure, of a socket associated with said camera and adapted to receive a flash lamp, means for releasably locking said film advancing means against two successive operations until the lamp has been removed from said socket, said means including a member movable to and from locking engagement with said film advancing means and adapted to be automatically moved to an operative position upon the completion of a film advancing step, a linkage movable to and from an operative position wherein it is adapted to releasably lock said member in its operative position, means normally moving said linkage to its inoperative position, and means actuated by the insertion of a lamp into said socket for moving said linkage to said operative position.

7. The combination with a photographic camera including a manually operable film advancing means for moving successive areas of film into position for exposure, of a socket associated with said camera and adapted to receive a flash lamp, means for releasably locking said film advancing means against two successive operations until the lamp has been removed from said socket, said means including a linkage movable to and from an operative position wherein it is adapted to hold said locking means in locking position relative to said film advancing means, means normally acting on said linkage to move the same to its inoperative position, and means actuated by the insertion of a lamp into said socket for moving said linkage to said operative position.

8. The combination with a photographic camera including a manually operable film advancing means for moving successive areas of film into position for exposure, of a socket associated with said camera and adapted to receive a flash lamp, means for releasably locking said film advancing means against two successive operations until the lamp has been removed from said socket, said means including a linkage movable to and from an operative position wherein it is adapted to hold said locking means in locking position relative to said film advancing means, a part of said linkage movably extending into said socket when said linkage is in its inoperative position, and adapted to be engaged and moved by a lamp when inserted into said socket, whereby said linkage is adapted to be moved to its operative position.

9. The combination with a photographic camera, including a manually operable film advancing means for moving successive areas of film into position for exposure, a socket associated with said camera and adapted to receive a flash lamp, means for releasably locking said film advancing means against two successive operations until the lamp has been removed from said socket, said means including a pivoted lever movable to and from an operative position wherein it is adapted to hold said locking means in locking position relative to said film advancing means, a spring normally moving said lever to its inoperative position, a pin on said lever extending through an aperture in the base of said socket and into said socket when said lever is in its inoperative position, said pin adapted to be engaged and pushed from said socket by a lamp inserted into said socket and for moving said lever to its operative position.

10. The combination with a photographic camera, including a manually operable shutter operating mechanism, of a socket associated with said camera and adapted to receive a flash lamp, means movable to and from an operative position wherein it is adapted to releasably lock said shutter operating mechanism against a successive operation, said means normally moved to an inoperative position wherein it has no effect on the successive operation of the shutter, and means actuated by the insertion of a lamp into said socket for moving said locking means to its operative position, whereby a successive operation of said shutter operating mechanism cannot be made without removing the burned lamp from the socket.

11. The combination with a photographic camera including a manually operable shutter operating mechanism, of a socket associated with said camera and adapted to receive a flash lamp, means movable to and from an operative position wherein it is adapted to releasably lock said shutter operating mechanism against a successive operation, and normally moved to an inoperative position wherein it has no effect on the successive operation of the shutter, said means including a part movably extending into said socket when said means is in its inoperative position, and adapted to be engaged and moved by a lamp inserted into said socket whereby said means is adapted to be moved to its operative position.

12. The combination with a photographic camera having a shutter and a manually operable shutter release mechanism including a member movable between an operative and an inoperative position, of a socket associated with said camera and adapted to receive a flash lamp, means for releasably locking said member against a successive operation, and movable to and from an operative position wherein it is adapted to positively engage and hold said member in one of its positions of movement, and means actuated by the insertion and removal of a lamp into and from said socket for moving said locking means to and from said operative position, respectively, whereby a successive operation of said member cannot be made without first removing the burned lamp from the socket.

13. The combination with a photographic camera having a shutter and a manually operable shutter release mechanism including a member movable between an operative and an inoperative position, of a socket associated with said camera and adapted to receive a flash lamp, means movable to and from an operative position in which it is adapted to positively engage said member after the same has been moved to operate the shutter and releasably lock said member against a successive operation, said means normally moved to an inoperative position, and means actuated by the insertion of a lamp into said socket for moving said locking means to, and holding said means in, said operative position, whereby a second operation of said member cannot be made without first removing the lamp from said socket.

14. The combination with a photographic camera having a shutter and a manually operable shutter release member movable between extended and retracted positions for releasing said shutter, of a socket associated with said camera and adapted to receive a flash lamp, means for releasably locking said shutter release member in one of its two positions until the lamp has been removed from said socket, said means including a member movable to and from an operative position wherein it is adapted to positively engage and hold said release member in one of its positions after the same has been operated, and means actuated by the insertion and removal of a lamp into and from said socket for moving said member to and from said operative position, respectively.

15. The combination with a photographic camera having a shutter and a manually operable shutter release member movable between extended and retracted positions for releasing said shutter, of a socket associated with said camera and adapted to receive a flash lamp, means for releasably locking said shutter release member in its retracted position until the lamp has been removed from said socket, said means including a member movable to and from an operative position wherein it is adapted to positively engage and hold said release member in its retracted position after the same has been moved to release the shutter, and means actuated by the insertion and removal of a lamp into and from said socket for moving said member to and from said operative position, respectively.

16. The combination with a photographic camera having a shutter and a manually operable shutter release member movable between extended and retracted positions for releasing said shutter, of a socket associated with said camera and adapted to receive a flash lamp, means for releasably locking said shutter release member in its retracted position until the lamp has been removed from said socket, said means including a member movable to and from an operative position wherein it is adapted to positively engage and hold said release member in its retracted position after the same has been moved to release the shutter, means normally moving said member to its inoperative position, said last mentioned means including a part adapted to movably extend into said socket to be engaged and moved by a lamp upon insertion into said socket, said member connected to said part to move therewith, whereby said member is adapted to be moved to its operative position when said part is moved by the insertion of a lamp into said socket.

17. The combination with a photographic camera having a shutter and a manually operable shutter release member movable between extended and retracted positions for releasing said shutter, of a socket associated with said camera and adapted to receive a flash lamp, means for releasably locking said shutter release member in its retracted position after the same has been moved thereto until the lamp has been removed from said socket, said means including a member movable to and from an operative position wherein it is adapted to positively engage and hold said release member in its retracted position, and means actuated by the insertion and removal of a lamp into and from said socket for moving said release member to and from said operative position, respectively, said means including a pivoted lever mounted to move to and from an operative position and to which said member is articulately connected to move therewith, means normally moving said lever from said operative position, a pin connected with said lever and adapted to movably extend into said socket when said lever is moved from said operative position, and adapted to be engaged and moved by a lamp upon insertion into said socket, whereby said lever and member connected thereto are moved to, and held in, their operative positions until said lamp is removed from said socket.

18. The combination with a photographic camera having a shutter, and a manually operable shutter release member movable between extended and retracted positions for releasing said shutter, of a socket associated with said camera and adapted to receive a flash lamp, means for releasably locking said shutter release member in its retracted position after the same has been moved thereto until the lamp has been removed from said socket, said means including a lever pivoted to move to and from an operative position, and normally moved from said operative position, a pin fixed to said lever and adapted to movably extend into said socket when said lever is in its inoperative position, and adapted to be engaged and moved by a lamp upon insertion into said socket, whereby said lever is adapted to be moved to, and held in, said operative position until said lamp is removed from said socket, an arm articulately connected to said lever to move therewith to and from an operative position wherein it is adapted to engage the surface of said shutter release member, and a spring normally acting on said arm to move the same relative to said lever and toward said release member, whereby said arm is adapted to snap into a recess in the surface of said member when the same is retracted to positively hold the same in said retracted position until the lamp is removed from said socket.

19. The combination with a photographic camera, including a film advancing means, a shutter setting means, and a shutter releasing means, each of said means capable of manual operation of a socket associated with said camera and adapted to receive a flash lamp, means for releasably locking each of said film advancing means, shutter setting means, and shutter releasing means against two successive operations, and movable to and from an operative position, and means actuated by the insertion and removal of a lamp, into and from said socket for moving said locking means to and from said operative position, respectively, whereby a successive operation of said shutter operating means, said shutter setting means, and said shutter releasing means cannot be made without first removing the burned lamp from the socket.

20. The combination with a photographic camera, including a setting type shutter, and manually operable means for setting said shutter, of a socket associated with said camera and adapted to receive a flash lamp, means for releasably locking said shutter setting means against two successive operations until the lamp has been removed from the socket, said means including a member movable to and from locking engagement with said shutter setting means and adapted to be automatically moved to locking position upon completion of a shutter setting step, a linkage movable to and from an operative position wherein it is adapted to releasably lock said member in its operative position, and means actuated by the insertion and removal of a lamp into and from said socket for moving said linkage to and from said operative position, respectively.

21. The combination with a photographic camera, including a setting type shutter, and manually operable means for setting said shutter, of a socket associated with said camera and adapted to receive a flash lamp, means for releasably locking said shutter setting means against two successive operations until the lamp has been removed from the socket, said means including a linkage movable to and from an operative position, wherein it is adapted to hold said locking means in locking position relative to said shutter setting means, means normally acting on said linkage to move the same to its inoperative position, and means actuated by the insertion of a lamp into said socket for moving said linkage to said operative position.

22. The combination with a photographic camera, including a setting type shutter, and manually operable means for setting said shutter, of a socket associated with said camera and adapted to receive a flash lamp, means for releasably locking said shutter setting means against two successive operations until the lamp has been removed from the socket, said means including a linkage movable to and from an operative position, wherein it is adapted to hold said locking means in locking position relative to said shutter setting means, means normally acting on said linkage to move the same to its inoperative position, a part of said linkage movably extending into said socket when said linkage is in its inoperative position, and adapted to be engaged and moved by a lamp when inserted into said socket, whereby said linkage is adapted to be moved to its operative position.

23. The combination with a photographic camera, including a shutter and an actuating member for operating the same, of a socket associated with said camera and adapted to receive a flash lamp, means for releasably locking said actuating member against two successive operations, and movable to and from an operative position wherein it is adapted to positively engage said actuating member upon the completion of one operation, and means actuated by the insertion and removal of a lamp into and from said socket for moving said locking means to and from said operative position, respectively, whereby a successive operation of said shutter cannot be made without first removing the burned lamp from the socket.

JOSEPH MIHALYI.